United States Patent
Turner et al.

(10) Patent No.: US 7,028,894 B2
(45) Date of Patent: Apr. 18, 2006

(54) SYSTEM AND METHOD FOR IDENTIFYING A RETAIL CUSTOMER'S PURCHASING HABITS

(75) Inventors: Kyle Turner, Lake Forest, IL (US); Kevin Morrin, Ithaca, NY (US); Jeffrey Gilbert, Homer, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

(21) Appl. No.: 10/936,754

(22) Filed: Sep. 8, 2004
(Under 37 CFR 1.47)

(65) Prior Publication Data
US 2005/0173522 A1 Aug. 11, 2005

Related U.S. Application Data

(60) Provisional application No. 60/501,199, filed on Sep. 8, 2003.

(51) Int. Cl.
*G06K 15/00* (2006.01)
(52) U.S. Cl. .................................................. 235/383
(58) Field of Classification Search ............... 235/383, 235/379, 381, 378, 375; 705/14
See application file for complete search history.

(56) References Cited

U.S. PATENT DOCUMENTS

| | | | | |
|---|---|---|---|---|
| 5,832,457 A | * | 11/1998 | O'Brien et al. ............... | 705/14 |
| 6,035,280 A | * | 3/2000 | Christensen ................. | 705/14 |
| 6,278,979 B1 | * | 8/2001 | Williams ...................... | 705/14 |
| 6,321,210 B1 | * | 11/2001 | O'Brien et al. ............... | 705/14 |
| 6,741,968 B1 | * | 5/2004 | Jacoves et al. ............... | 705/14 |
| 6,876,978 B1 | * | 4/2005 | Walker et al. ................ | 705/26 |
| 6,885,996 B1 | * | 4/2005 | Nicholson .................... | 705/14 |
| 2003/0014306 A1 | * | 1/2003 | Marko .......................... | 705/14 |
| 2004/0251305 A1 | * | 12/2004 | Klapka et al. .............. | 235/383 |

* cited by examiner

*Primary Examiner*—Thien M. Le
*Assistant Examiner*—Edwyn Labaze
(74) *Attorney, Agent, or Firm*—George R. McGuire; Bond, Schoeneck & King, PLLC

(57) ABSTRACT

A system and method for targeting marketing messages at a point-of-sale consumer by collecting current transactional receipt data, such as the time of a retail transaction, the date of the transaction, the number of items purchased the transaction, and the total dollar value of a transaction. The data collected from the receipt is then applied to one or more algorithms to determine which marketing messages are most likely to be successful. A predetermined number of marketing messages found most likely to be successful are then printed on the customer receipt in order of priority of expected effectiveness. The system is designed to be used in connection with a point-of-sale terminal without the need for additional hardware, such as a second printer, or the need to access historical customer data.

19 Claims, 3 Drawing Sheets

SYSTEM AND METHOD FOR IDENTIFYING A RETAIL CUSTOMER'S PURCHASING HABITS

CROSS REFERENCE TO RELATED APPLICATION

The present application claims priority to U.S. Provisional Application Ser. No. 60/501,199 of the same title, filed on Sep. 8, 2003, and hereby incorporated by reference.

BACKGROUND OF THE INVENTION

1. Field of Invention

The present invention relates to the identification of customer purchasing habits and, more specifically, to a system and method of identifying habits through the analysis of transaction attributes.

2. Description of Prior Art

Conventional point-of-sale computer systems, such as those used in retail stores to record transactions, have played limited roles in customer relationship management. The inflexibility of the traditional retail application along with the limited functionality of retail point of sale printers has acted as a limiter to the marketing intentions of retail management.

Attempts to improve point-of-sale marketing typically involve the issuance of promotions, often in the form of coupons, to a customer in the checkout lane. In order to increase the effectiveness of such advertising, systems identify a particular customer through a shopper's club card or other individually distinguishable indicia that is presented to the teller at the time of check out. Once a customer is identified, the system can scan a database of previous purchases made by that customer to identify purchasing habits. Based on these habits, the customer can be issued a coupon, often with the intent of getting the customer to stray from favorite brand names.

Systems such as that described require a secondary system with a secondary printer. This secondary system operates independently of the retail system but is capable of accessing data concerning customer transactions. These systems are the subject of much criticism from retailers, however, that are concerned with the secondary hardware and applications that must reside in their stores. Many retailers also object to granting access to data regarding past purchases of their customers. Along these lines, consumers have expressed concern regarding the privacy of their transactions as many consumers feel that prior purchases are personal business and should not be used by a marketing company to derive profit.

3. Objects and Advantages

It is a principal object and advantage of the present invention to provide a less intrusive manner of marketing to retail customers.

It is an additional object and advantage of the present invention to reduce the point-of-sale hardware and applications needed by retailers.

It is a further object and advantage of the present invention to alleviate the need for a point-of-sale system to retrieve historical customer data in order to target marketing at a particular customer.

Other objects and advantages of the present invention will in part be obvious, and in part appear hereinafter.

SUMMARY OF THE INVENTION

The present invention comprises the analysis of the time of a retail transaction, the date of the transaction, the number of items purchased the transaction, and the total dollar value of a transaction. Based on these inputs, a value is assigned to the transaction that represents the likelihood that the consumer making the transaction is or will be purchasing an item from a predetermined list of consumer product categories. This information is then applied to an algorithm that identifies which currently active marketing message, e.g., coupon, would be most effective to the particular consumer. After the effectiveness of each active marketing message is identified, the point-of-sale printer is then used to print a predetermined maximum number of marketing messages that were determined to be the most effective.

DETAILED DESCRIPTION

Figure 1:
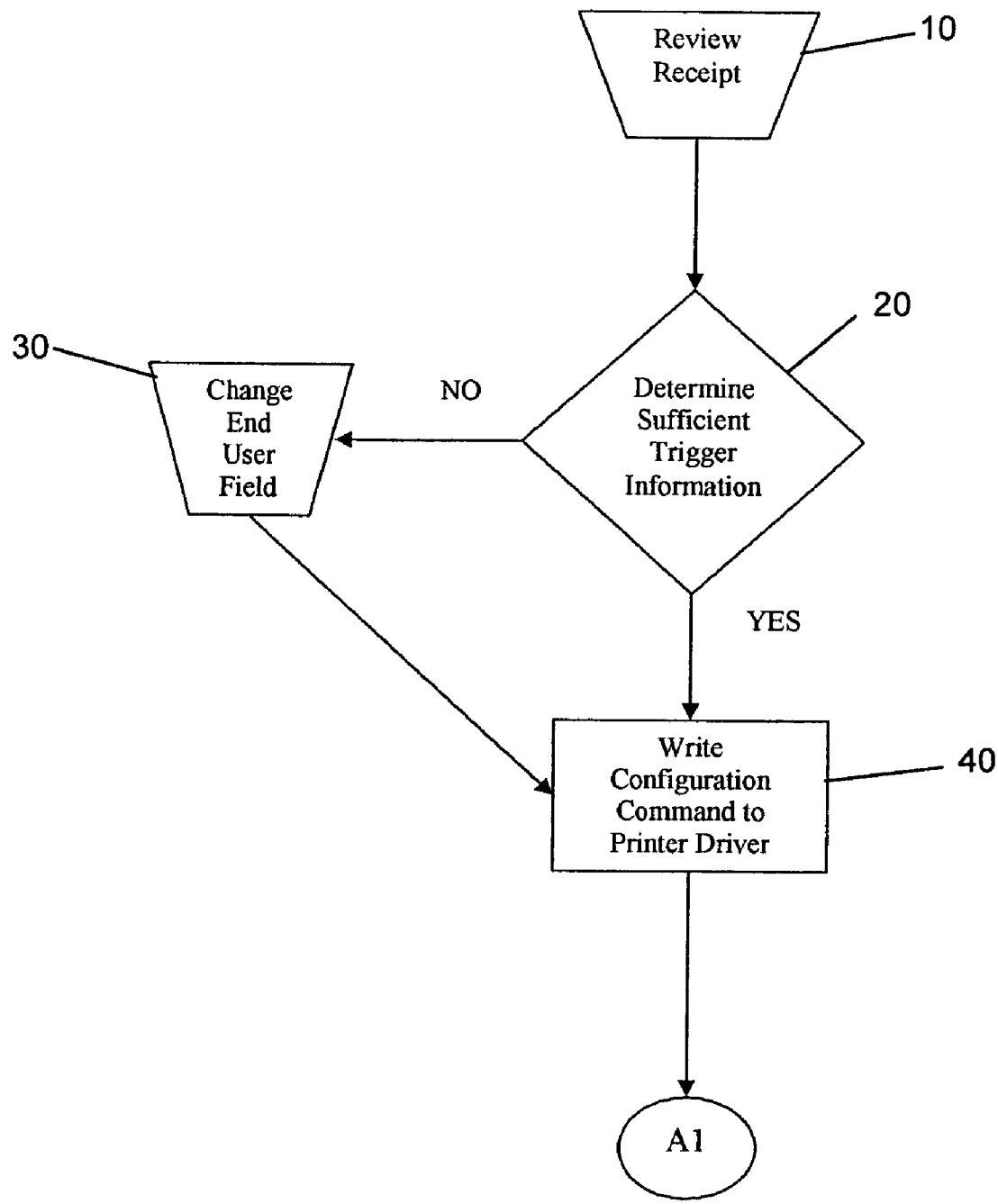
FIG. 1 is a high-level flowchart of the configuration of a system according to the present invention.

Referring now to the drawings wherein like numerals refer to like parts throughout, there is seen in FIG. 1 a flowchart of the configuration of a point-of-sale system according to the present invention.

The first step is to review the receipt 10 to determining whether a retailer's existing sales receipt format has a triggering element. A triggering element is a text string of ASCII characters that is uniquely present only once on the receipt and is consistently positioned a calculable distance preceding information of interest for triggering. A service/sales technician generally performs this step manually. For example, a triggering element could comprise the receipt total (e.g., "Total . . . $19.75"). The text string "Total" appears only once on the receipt and consistently precedes the numerical representation for the total of the purchases for the current transaction.

The second step involves determining whether the triggering elements meet the unique and repeatable requirements of the present invention, referred to in FIG. 1 as Sufficient Trigger Info 20. In decision block Sufficient Trigger Info 20, a service/sales technician manually decides if the triggering elements that exist that meet the unique and repeatable requirements of the present invention. If the appropriate triggering elements do not exist, a representative from the retailer must modify the retail application to insert text strings that will qualify as triggering elements, referred to as Change End User Field 30.

Once Change End User Field 30 is performed, or if an appropriate triggering element was previously determined as sufficient by Sufficient Trigger Info 20, configuration commands 40 are written to the decision-making element, i.e., the printer driver. In some applications, the printer firmware will allow it to be the configurable decision making element that will be responsible for searching out the defined triggering elements. In other applications this decision power may be placed further "up stream" of the printing device. For example, the decision power may be incorporated into a driver resident on the host terminal. In state A1, the point-of-sale system is configured according to the present invention.

Figure 2:
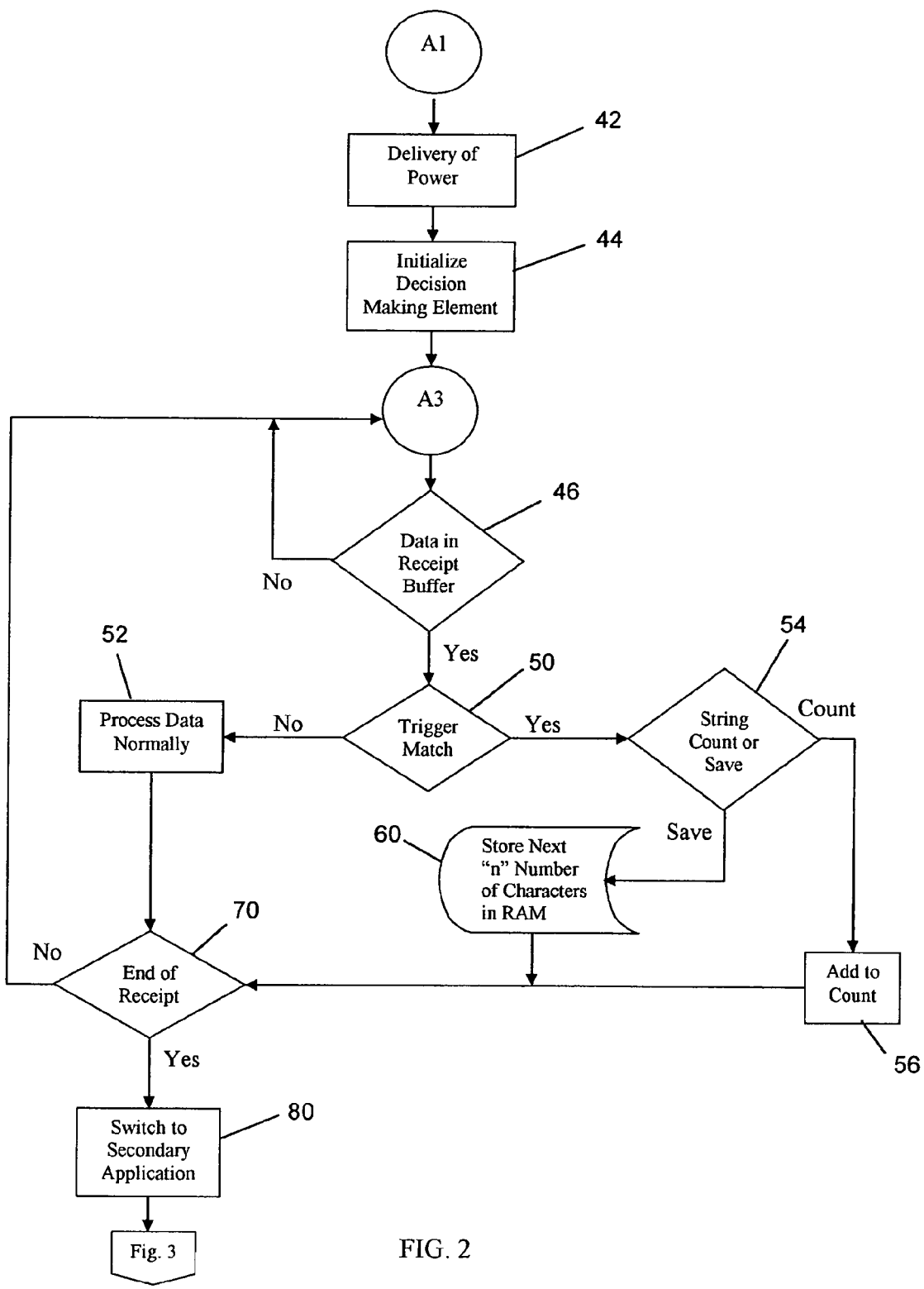
FIG. 2 is the first part of a high-level flowchart of the initialization and operation of a system according to the present invention.

As seen in FIG. 2, the initialization and operation of a system according to the present invention begins from the configured state A3 with the delivery of power 42 to the printer. Next, commands are sent to the decision making element (such as the printer driver) to initialize 44 the configuration parameters established during the configuration phase. Once powered and initialized, the printer is in ready state A3. If data is received 46 into the print buffer, the data is then checked for a trigger match 50. In this step, the printer firmware or driver checks the data present in the print buffer for the presence of any of the configured triggering elements. If there is no trigger match 50, the data is processed normally 52.

If there is a trigger match 50, the trigger is evaluated to determine whether it is a "save" trigger indicating that information must be stored, or a "count" trigger indicating that a counter is to be indexed, referred to in FIG. 2 as String Count or Save 54. An example of a "save" trigger type would be the string "Total," because the data following this trigger string would be stored for future use. An example of a "count" trigger would be the string "$," which identifies that an item was purchased based on the printing of the item price on the receipt. By counting the number of times the item prices are to be printed, it is possible to determine how many items were actually purchased.

If a save trigger is recognized in String Count or Save 54, the appropriate number of characters following the trigger are then stored in RAM 60 at a dedicated index number. If a count trigger is determined in String Count or Save 54, the appropriate count is incremented 56.

Regardless of whether a save or count trigger was determined in String Count or Save 55, control next passes to End of Receipt 70 for determination whether the end of the receipt has been reached. If the end of the receipt has not been reached, control passes back to ready state A3. If a determination is made the end of the receipt has been reached by, for example, detecting the presence of some type of receipt separator command (like a knife cut command), the operation of searching for triggering elements ends and control is switched to a secondary application 80. Such a firmware or software switch allows for an interruption in the retail application, during which time a secondary application becomes active and applies the necessary algorithms.

Figure 3:
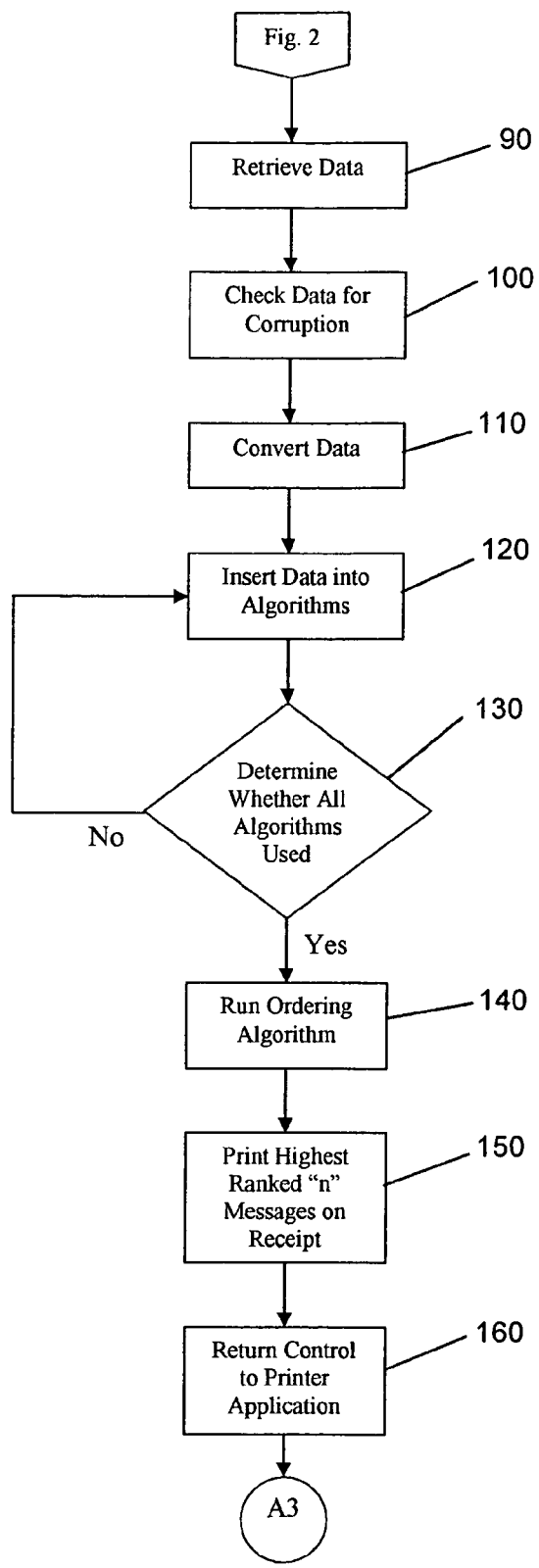
FIG. 3 is the second part of a high-level flowchart of the initialization and operation of a system according to the present invention.

As seen in FIG. 3, a secondary application retrieves 90 each piece of data stored in RAM 60 after control is switched 80. The retrieved data is checked 100 for blank cells and string content as a means of determining if the data is corrupt. Secondary application then converts 110 all ASCII numerals into binary numerals.

The converted 100 numerals are then inserted 120 into user identification algorithms to determine the percent likelihood that the current customer is a regular consumer of a specific item. The character counts from step 55 are also entered in to the algorithms. A historical store-specific correction factor may also applied to these counts before they are input into the algorithm to account for idiosyncrasies among individual retail stores.

Examples of algorithms would be those taken from statistical linear regression and related statistical methods as described in marketing textbooks. For instance, a receipt with a high number of soft drink items probably indicates that the customer is a high-probability candidate who would use a coupon offering a modest savings on a soft drink brand not present on the receipt. Thus, in addition to counts of individual items, combining purchased items into categories and deriving sub-totals of the dollars spent in each category may also be useful variables for building predictive regression algorithms that forecast the effectiveness of candidate coupons. In a more sophisticated vein, count values could be treated non-linearly as when only one soft drink item was purchased, perhaps indicating a brand loyalty that requires a very high-value coupon to entice that customer to try a competing soft drink brand.

After data is input into algorithms, a check 130 is performed to determine whether all of the data has been input into all of the available algorithms. Several algorithms will often exist to help determine the percent likelihood a customer will buy a product in a certain category. For maximum effectiveness, all of the the data converted in step 110 must be applied to all algorithms for all product categories. If all of the data has not been input in all of the algorithms, control is sent back so that additional data may be inserted 120 into the algorithms for determination of the likelihood certain products will be purchased.

Once all data has been input into all algorithms and the percent likelihoods determined, a predetermined number of coupons are selected to be printed at the end of the receipt. As a result, a decision must be made which coupons should be printed on the current customer receipt. After determining the percent likelihood that a customer will buy a specific product type by performing the algorithms 120, a second ordering algorithm 140 is run to determine which coupons will be most effective in influencing the customer. The ordering algorithm 140 may also be used to order the printing of the coupons according to which ones will yield the largest revenue contribution, i.e., the marketing messages or coupons are ranked according to expected likelihood of success. This ordering is beneficial if the coupon system operator is paid based on the number of coupons actually redeemed.

Once the ordering algorithm 140 is finished and the coupons have been ranked, the coupons are printed 150 on the receipt. Assuming that the maximum allowable messages to append to a customer's receipt is "N," the highest ranked "N" messages are selected and printed on the customer receipt. Once printing 150 is complete, control is restored to the printer application.

What is claimed is:

1. A method of determining which coupons to print on a receipt during a point-of-sale transaction, said method comprising the steps of:
   receiving print data from a host application;
   identifying a triggering element in said print data;
   determining whether said predefined triggering element comprises data to be stored or data to be counted;
   storing said data if said triggering element comprises data to be stored;
   counting said data if said triggering element comprises data to be counted;
   interrupting the printing of said print data;
   inputting said stored data and said counted data in a predetermined algorithm;
   determining whether to print said coupons based on the results of said algorithm; and
   printing said print data and said coupons on said receipt.

2. The method of claim 1, further comprising the step of ordering said coupons based on the results of said algorithm prior to printing said coupons.

3. The method of claim 1, wherein said triggering element comprises the date of said point-of-sale transaction.

4. The method of claim 1, wherein said triggering element comprises the time of said point-of-sale transaction.

5. The method of claim 1, wherein said triggering element comprises a total dollar value of said point-of-sale transaction.

6. The method of claim 1, wherein said triggering element comprises a dollar value of an item in said point-of-sale transaction.

7. The method of claim 1, wherein said triggering element comprises the number of items in said point-of-sale transaction.

8. The method of claim 1, wherein said triggering element comprises the number of items present in said point-of-sale transaction that belong to a predetermined category of consumer products.

9. The method of claim 1, wherein said triggering element comprises the total dollar value of items in said point-of-sale transaction that belong to a predetermined category of consumer products.

10. A printer adapted to receive print data from a host application of a point-of-sale system, said printer comprising:
- a first memory for storing at least one triggering element comprising data to be stored or data to be counted;
- means for identifying said triggering element in said print data;
- a second memory adapted for counting and storing said data to be counted and said data to be stored;
- means for determining whether to print one or more coupons based on calculations using said data to be counted and said data to be stored; and
- a print mechanism for printing said coupon and said print data on said receipt.

11. The printer of claim 10, wherein said means for determining whether to print one or more coupons based on calculations using said data to be counted and said data to be stored comprises a secondary application programmed with a predetermined algorithm.

12. The printer of claim 11, wherein said secondary application is programmed to order said coupons based on said algorithm.

13. The printer of claim 10, wherein said triggering element comprises the date of a point-of-sale transaction.

14. The printer of claim 10, wherein said triggering element comprises the time of a point-of-sale transaction.

15. The printer of claim 10, wherein said triggering element comprises a total dollar value of a point-of-sale transaction.

16. The printer of claim 10, wherein said triggering element comprises a dollar value of an item in a point-of-sale transaction.

17. The printer of claim 10, wherein said triggering element comprises the number of items in a point-of-sale transaction.

18. The method of claim 10, wherein said triggering element comprises the number of items present in said point-of-sale transaction that belong to a predetermined category of consumer products.

19. The method of claim 10, wherein said triggering element comprises the total dollar value of items in said point-of-sale transaction that belong to a predetermined category of consumer products.

* * * * *